United States Patent Office 2,767,128
Patented Oct. 16, 1956

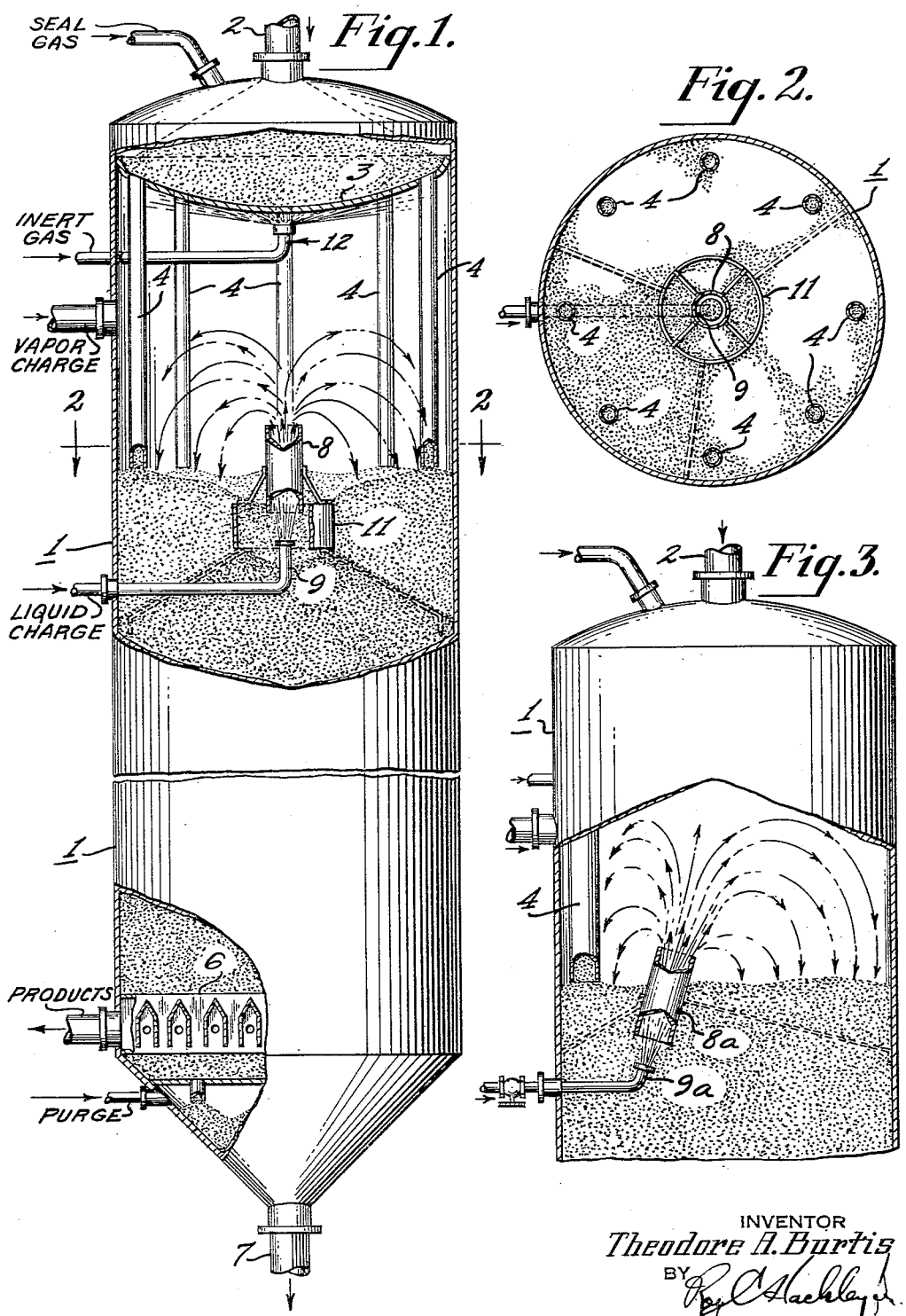

2,767,128

METHOD AND APPARATUS FOR CONTACTING SOLIDS WITH FLUIDS

Theodore A. Burtis, Media, Pa., assignor to Houdry Process Corporation, Wilmington, Del., a corporation of Delaware Application May 2, 1951, Serial No. 224,184

10 Claims. (Cl. 196—52)

This invention relates to a moving bed recycling apparatus in which a downwardly moving substantially compact bed of particle-form solids is contacted with a fluid and subsequently elevated to a position from whence the cycling operation commences anew.

The present invention is susceptible to employment in various fluid-solid contacting processes including hydrocarbon conversion systems, and particularly in such systems wherein solid granular catalyst of comparatively large particle size is moved in continuous cycle between a reaction or a contacting zone and a regeneration zone.

An object of this invention is the provision of an improved method and means for effecting complete contact of fluids, whether gaseous, or liquid, or a combination of gas and liquid, with solid particles whether they be reactants, catalysts, or absorbents.

Another object is the provision of a fluid jet into which there is introduced a portion of the solid particles from the downwardly moving compact bed of particle-form solids to thereby insure an intimate contact between the fluid and the solids.

Still another object is to provide a fluid-solid contacting method and means which is adapted to provide uniform distribution of fluid-contacted solids in a moving bed recycling apparatus. Various other objects will become apparent from the description which follows read in connection with the accompanying drawings illustrating practical embodiments thereof as applied to a catalytic hydrocarbon conversion system.

In the drawings:

Figure 1 is a fragmentary diagrammatic elevational view partly in section showing one form of the present invention with relation to certain associated elements of part of such a contacting system.

Figure 2 is a plan view on the line 2—2 of Figure 1.

Figure 3 is a partial elevational view partly in section showing another embodiment of the invention.

Referring particularly to the embodiment illustrated in Figure 1 of the drawings, there is shown a reactor housing 1 into which at the upper end thereof hot catalyst is introduced through conduit 2 to accumulate in a temporary storage region generally between the top of reactor housing 1 and a tube sheet member 3 therebelow. Dependent from tube sheet 3 in peripheral spaced relation are a multiplicity of transfer passage members or downcomers 4 through which catalyst gravitates from the temporary storage region to a generally common level within the main section of the reactor. Catalyst introduced through downcomers 4 gravitates as a more or less substantially compact bed in non-turbulent flow from the level established by the outlet level of these downcomers, down through reaction vessel 1, through a solids-gas disengaging region generally indicated at 6, through a purging region therebelow, and is then discharged from the vessel through conduit 7. The reaction zone is the region generally between tube sheet 3 and the disengaging region 6 of vessel 1, and more particularly is coextensive with the gravitating bed of catalyst. The path of travel of the catalyst subsequent to passage through conduit 7 is immaterial to the operation of the present invention, but may take any suitable course such as passage through a regeneration zone, elevation to a level above reaction zone 1 and reintroduction to the reaction zone through conduit 2 to complete the cycling operation.

Located within the main reaction zone of vessel 1 is a vertical, generally open ended, tubular guide pipe 8, providing a confined path extending downwardly from an upper level spaced appreciably below tube sheet 3, but above the lower limit of downcomers 4, to a region or level below the surface and within the bed of catalyst continuously supplied through downcomers 4. Guide pipe 8 generally has cross-sectional area substantially less than the cross-sectional area of vessel 1. A fluid inlet line 9 terminating in any suitable fluid distributing or dispersing device or nozzle is located below and directed upwardly toward the lower open end of guide pipe 8 and spaced apart therefrom sufficiently so that fluid introduced through line 9 and its associated nozzle contacts solids below guide pipe 8 and conveys such contacted solids into and upwardly therethrough. After emergence from guide pipe 8 the contacted solids and the elevating fluid pass generally in fountain-like formation into the space above the bed of catalyst and beneath tube sheet 3, whereupon the solids being subject to the force of gravity fall to and are distributed generally uniformly across the surface of the bed of catalyst and thereafter gravitate as part of the gravitating bed. Fluid discharged from guide pipe 8 follows a flow pattern generally similar to that of the catalyst and ultimately moves in concurrent relationship therewith through the reaction zone of vessel 1.

Vertical guide pipe 8 may have associated therewith a vertically adjustable tubular member 11 being generally concentric therewith and having a larger diameter than guide pipe 8; the purpose of member 11 being to control the relative amount of catalyst which may be admitted for subsequent contact with fluid introduced through line 9 for contact and elevation through guide pipe 8. Tubular member 11 while illustrated as cylindrical may be of any suitable configuration including frusto-conical or even non-circular and is vertically positioned with respect to the surface of the gravitating catalyst bed in such manner that a suitably controlled amount of catalyst flows inwardly over the upper edge thereof and thus downwardly into contact with the rising stream of fluid introduced through line 9. The outer extent of tubular member 11 serves to restrain the major portion of catalyst from passing into the contacting region below guide pipe 8 and thus prevents recycle of any substantial quantity of catalyst which has been previously contacted by fluid introduced through line 9.

Fluid introduced through line 9 may be liquid, mixed phase or vapors; however, inasmuch as this invention has particular advantage in the introduction for uniform contacting of liquid hydrocarbons, it is preferred to operate with liquid or mixed phase feed in this region. Hydrocarbons may be introduced in vapor form to the region above the liquid contacting elements 9, 8 and 11 as shown diagrammatically in Figure 1. If desired, also, an inert gas may be introduced into the upper region of the reaction zone as generally indicated at 12 for the purpose of providing a gaseous blanket above the liquid contacting region to reduce or eliminate contact of oily materials with exposed metal surfaces under conditions which may tend to form coke thereon.

While the embodiment, illustrated in Figures 1 and 2 wherein like numbers designate like parts, thus far described shows the contacting members 8, 11, and 9 positioned generally concentric within the reaction vessel, and the solids introduced peripherally in bed-forming manner, it is within the scope of this invention to introduce solids to form the bed of gravitating material in other suitable manner, such as predominately to one side of such a reaction zone as shown in the embodiment in Figure 3. In such alternative embodiment the guide pipe 8a and a fluid introduction member 9a are placed adjacent to the point of introduction of the solids, operating otherwise in similar fashion to that heretofore described. By appropriate positioning of the guide pipe, distribution of such contacted solids is effected relatively uniformly throughout the entire cross-sectional area of such a gravitating bed. In such case, also, the guide pipe may be inclined from the vertical in suitable direction to effect the desired distribution pattern. A control member similar to tubular member 11 of Figure 1 may be employed with the embodiment illustrated in Figure 3 and may have suitable configuration consistent with the desired operation.

Obviously many modifications and variations of the invention as hereinbefore set forth may be made without departing from the spirit and scope thereof and therefore only such limitations should be imposed as are indicated in the appended claims.

I claim:

1. The method of contacting particle-form solids with liquids which comprises the steps of passing said solids downwardly as a compact moving bed partly filling a confined reaction zone, continuously introducing at least one compact moving column of said solids directly onto the surface of said bed so as to maintain a constant bed level, introducing an upwardly directed stream comprising said liquid into said bed from a location below the surface thereof so as to contact said solids and convey the same upwardly, passing the upwardly conveyed stream of liquid-contacted solids into and through a short confined path extending upwardly from a location within said bed spaced axially above the incoming liquid stream to a low point within the space above the surface of said bed, and distributing said liquid-contacted solids over the surface of said bed by gravitational deceleration and free fall following their discharge from said confined path.

2. Apparatus for contacting liquid hydrocarbons with a compact moving bed of particle-form catalyst comprising a contact vessel adapted to be partly filled by said bed, a nozzle arranged to discharge said liquid hydrocarbons upwardly within the upper region of said bed, a tubular member above and axially aligned with said nozzle, said tubular member extending above and below the surface of said bed, and a short wide tubular member located wholly within said bed and concentrically surrounding said nozzle and the lower end portion of said tubular member.

3. Apparatus as defined in claim 2 including means for continuously introducing catalyst into said contact vessel, said means being adapted to maintain the surface of said bed at a level between the upper ends of said tubular members.

4. The method of contacting particle-form solids with liquids which includes forming a gravitating compact bed of solids within a reaction vessel, introducing a liquid-containing stream upwardly from below the surface of said bed, directly contacting a portion of said solids composed entirely of solids from said bed with said stream so as to elevate said portion, and thereafter passing the contacted solids upwardly through a laterally confined region within but out of contact with said gravitating bed to a discharge level above the surface of said bed, and discharging said contacted solids so as to effect the distribution thereof across the surface of said bed.

5. The method of contacting liquids with particle-form solids which includes forming a gravitating compact bed of solids within a vessel, introducing a stream of fluid comprising liquid into and below the surface of said bed, contacting solids composed entirely of solids from said bed with said stream and directing the mixture of the contacted solids and the contacting stream upwardly through a laterally confined path extending upwardly from within said bed to a space within said vessel and above the surface of said bed, and distributing solids from the upper end of said path to and across the surface of said bed.

6. The method of contacting liquid with particle-form solids which includes forming a gravitating compact bed of solids having an upper surface and being laterally confined and supported from below to maintain a substantially uniform volume thereof, forming a confined space having as its lowermost boundary the surface of said bed, introducing liquid into contact with solids composed entirely of solids from said bed and passing the mixture of liquid and contacted solids from within said bed upwardly to said space above the surface of said bed through a guide path having a cross-sectional area substantially less than the cross-sectional area of said bed, and distributing thus contacted solids from said path to and across the surface of said bed.

7. The method of contacting fluid with particle-form solids which includes forming a gravitating compact bed of solids within a vessel, forming a baffled region within and adjacent the surface of said bed continuously passing a portion of said solids from the surface of said bed into said baffled region, introducing a stream of fluid upwardly into said baffled region, contacting solids within said region with said stream and elevating such contacted solids through a laterally confined path extending from within said baffled region to above the surface of said bed, and distributing solids from said path to and across the surface of said bed.

8. The process for the conversion of hydrocarbons by contact at conversion conditions with catalyst gravitating in a compact bed through a reaction zone and wherein such hydrocarbons are introduced at least partially in liquid phase, comprising introducing particle-form catalyst at conversion temperature into a reaction zone to form therein a gravitating compact bed, introducing into said bed a stream of liquid-containing hydrocarbons to contact a controlled portion of catalyst composed entirely of catalyst from said bed, elevating the liquid-contacted catalyst through an upwardly extending guide path discharging above the surface of said bed, distributing contacted catalyst from said path substantially uniformly across the surface of said bed, and passing hydrocarbons concurrently with said bed at conversion conditions.

9. In the method of hydrocarbon conversion comprising contacting hydrocarbons at least partially in liquid phase with solids to effect thereby substantially uniform contact of solids by hydrocarbons and substantially uniform distribution of said contacted solids throughout a gravitating compact bed of such solids, such contacted solids being wholly supplied by solids from said bed, the improvement comprising establishing a gravitating compact bed of solids within a conversion zone, establishing within said bed a relatvely small contact region, introducing by gravity flow from said bed solids to be contacted by hydrocarbon fluid in said contact region, introducing hydrocarbon fluid-containing liquid into said contact region, contacting solids therein with said fluid and passing said fluid and contacted solids as a confined stream upwardly from said contact region to a level above said gravitating bed and within an upper region of said conversion zone, and distributing said stream generally uniformly across the surface of said bed for gravitational flow therewith through said conversion zone at conversion conditions.

10. The method of contacting liquid hydrocarbons with a catalyst in particle form which includes forming a downwardly moving compact bed of the catalyst, forming an upwardly moving jet of liquid hydrocarbons within a baffled area in said catalyst bed, continuously permitting a portion of the catalyst from said bed to flow over said baffle and into said jet, passing said jet and catalyst engaged thereby through a vertically disposed tubular member which extends upwardly from a location within said bed above the lower end of said jet to a level spaced a relatively short distance above said catalyst bed, and permitting the catalyst and adsorbed hydrocarbons issuing from said vertically disposed tubular member to fall onto said bed.

References Cited in the file of this patent
UNITED STATES PATENTS

| | | |
|---|---|---|
| 2,520,146 | Houdry | Aug. 29, 1950 |
| 2,548,286 | Bergstrom | Apr. 10, 1951 |
| 2,556,514 | Bergstrom | June 12, 1951 |
| 2,663,677 | Savage et al. | Dec. 22, 1953 |
| 2,687,372 | Ray | Aug. 24, 1954 |